United States Patent [19]
Kashiwagi et al.

[11] Patent Number: 5,538,528
[45] Date of Patent: Jul. 23, 1996

[54] GLASS OPTICAL ELEMENT PRESS-MOLDING DIE HAVING A TANTALUM CONTAINING ALLOY SURFACE LAYER

[75] Inventors: Yoshinari Kashiwagi, Neyagawa; Makoto Umetani, Izumi; Masaki Aoki, Minoo, all of Japan

[73] Assignee: Matsushita Electric Industrial Co., Ltd., Osaka, Japan

[21] Appl. No.: 178,858

[22] Filed: Jan. 7, 1994

[30]   Foreign Application Priority Data

Jan. 7, 1993  [JP]  Japan ..................... 5-001404

[51] Int. Cl.⁶ ......................................... C03B 11/08
[52] U.S. Cl. ................... 65/275; 65/374.11; 65/374.12; 65/374.13; 425/808
[58] Field of Search ............. 65/374.11, 374.12, 65/374.13, 275; 425/808

[56]   References Cited

U.S. PATENT DOCUMENTS 4,685,948  8/1987  Kuribayashi et al. .............. 65/374.11
4,721,518  1/1988  Monji et al. ........................ 65/374
5,028,251  7/1991  Schinker et al. .................. 65/374.13
5,125,949  6/1992  Hirota et al. ...................... 65/374.13
5,171,348  12/1992  Umetani et al. .................. 65/374.11

FOREIGN PATENT DOCUMENTS

0164930  12/1985  European Pat. Off. .
0191618  8/1986  European Pat. Off. .
0404481  12/1990  European Pat. Off. .
59-121126  12/1982  Japan .
63-166729  7/1988  Japan .
5-285624  11/1993  Japan .
6-211540  8/1994  Japan .

*Primary Examiner*—Donald E. Ozaja
*Assistant Examiner*—Steven P. Griffin
*Attorney, Agent, or Firm*—Fish & Richardson

[57]   ABSTRACT

A die for press-molding a glass optical element which includes a base material having a surface to press-mold glass and a tantalum(Ta)-containing alloy thin layer on the surface, the base material being heat-resistant and strong enough to withstand press-molding.

12 Claims, 7 Drawing Sheets

GLASS OPTICAL ELEMENT PRESS-MOLDING DIE HAVING A TANTALUM CONTAINING ALLOY SURFACE LAYER

FIELD OF THE INVENTION

This invention relates to dies for press-molding glass optical elements. More specifically, it relates to dies for press-molding fine glass optical elements which do not require a polishing process after being press-molded.

BACKGROUND OF THE INVENTION

Repeated press-molding fine glass optical elements needs dies mechanically strong enough not to lose their shape during press-mold processing. Such dies should be stable to high temperatures, resistant to oxidation, and inert with respect to glass. Further, the dies must be excellent in machinability so as to be machined precisely and easily.

Conventional press-molding dies include, for example, a die of mixed materials including titanium carbide (TiC) and a metal, as disclosed in Japanese Unexamined Patent Publication SHO 59-121126, and a die composed of cemented carbides and a precious metal thin layer formed thereon, as disclosed in Japanese Unexamined Patent Publication SHO 62-96331.

These conventional dies, however, could not satisfy all the conditions. Although the die made of TiC and a metal is hard and mechanically strong, it is very difficult to machine the dies precisely. In addition, the die has the problem of reacting with components of glass optical elements, such as lead (Pb) or alkaline metals.

On the other hand, dies made of cemented carbides coated with a thin layer of a precious metal are superior in mechanical strength and easy to process. They hardly react with glass in an inert gas atmosphere, such as nitrogen gas, up to about 600° C. during repeated press-molding. However, at 650° C. or more, the surface of the dies changes in color, and becomes cloudy after about 100 times of press-moldings. Thus, the dies cannot withstand further use. At 650° C. or more, the dies show no satisfactory wetting to and releasing from glass.

To improve the press-molding dies, a die composed of cemented carbides coated with a nickel (Ni)-precious metal alloy thin layer is proposed in Japanese Unexamined Patent Publication SHO 64-61327. The proposed die still has a problem of suffering grain growth after 1000 times of press-moldings at 650° C. or more, and becoming rough. Thus, the die can not repeatedly press-mold higher-melting glass.

Therefore, higher-melting glass optical elements cannot be mass-produced using the conventional press-molding dies.

SUMMARY OF THE INVENTION

To solve the above-noted problems, this invention aims to provide a die for press-molding glass optical elements which will not deteriorate even after repeatedly press-molding fine higher-melting glass optical elements over a long period of time.

The invention provides a die for press-molding a glass optical element comprising a base material having a surface to press-mold glass, and a tantalum (Ta)-containing alloy thin layer on the surface, the base material being heat-resistant to the softening point of the glass or more and being strong enough to withstand press-molding.

It is preferable that the Ta-containing alloy thin layer comprises an alloy thin layer containing Ta and the remainder containing at least one element selected from the group consisting of Pt, Rh, It, Ru, Os, Re, W and Pd.

It is also preferable that the Ta content of the Ta-containing alloy thin layer is 5 to 95 wt %.

It is further preferable that the Ta-containing alloy thin layer has a thickness of 1 to 5 μm.

It is also preferable that the base material comprises at least one material selected from the group consisting of cemented carbides comprising tungsten carbide (WC) with at least 50 wt %, a cermet comprising titanium carbide (TIC) with at least 50 wt %, a cermet comprising titanium nitride (TIN) with at least 50 wt % and a WC sintered body.

It is also preferable that the press-molding die of the invention further comprises a middle layer between the base material and the Ta-containing alloy thin film for strengthening adhesion of the base material to the Ta-containing alloy thin layer, and the middle layer comprises at least one material selected from the group consisting of tantalum carbide (TaC), tantalum nitride (TaN) and tantalum oxide ($Ta_2O_5$).

It is also preferable that adhesion of the base material to the middle layer and adhesion of the middle layer to the Ta-containing alloy thin layer are each stronger than that of the base material to the Ta-containing alloy thin layer.

It is further preferable that the base material comprises a carbide and the middle layer comprises tantalum carbide (TaC).

It is also preferable that the base material comprises a nitride mind the middle layer comprises tantalum nitride (TaN).

It is also preferable that the base material comprises an oxide and the middle layer comprises tantalum oxide ($Ta_2O_5$). All the carbides, nitrides or oxides are generally possible for use in forming the base material as long as they are strong enough to withstand press-molding. Combination of a carbide base material and a TaC middle layer, that of a nitride base material and a TaN middle layer, and also that of an oxide base material and a $Ta_2O_5$ middle layer provide a better performance of the dies.

It is also preferable that the middle layer is a heat-diffusion preventive layer to prevent metal present in the base material from diffusing into the Ta-containing alloy thin layer due to heat.

It is also preferable that the heat-diffusion preventive layer comprises at least one material selected from the group consisting of Re and W.

It is also preferable that the middle layer has a thickness of 1 to 3 μm.

DETAILED DESCRIPTION OF THE PREFERRED EMBODIMENTS

The press-molding die of the preferred embodiment of the invention is strong, easy to minutely process and resistant to high temperatures, so as to satisfy all of the needs for press-molding glass optical elements. Therefore, the die can mass-produce very fine higher-melting glass optical elements by repeatedly press-molding without deteriorating.

Examples of the invention will be explained with reference to Tables and the accompanying drawings.

EXAMPLE 1

Cemented carbides comprising tungsten carbide (WC) as its principal component (20 mm diameter, 5 mm thick) was processed into a pair of a concave upper half die and a concave lower half die whose curvature diameters were 46 mm and 200 mm, respectively. The press-mold surfaces of the dies were polished to a mirror surface using an abrasive grain of ultrafine diamonds. The dies were finished by coating their mirror surfaces with a 3 μm thick alloy thin film selected from a Ta-Pt, Ta-Rh, Ta-Ir, Ta-Ru, Ta-Os, Ta-Re, Ta-W, and Ta-Pd thin films by a sputtering method. The base material temperature was 450° C., the sputtering power was 150 W, and the pressure of argon gas was $1.1 \times 10^{-3}$ Torr. Preferable sputtering conditions include a base material temperature of 100° to 600° C., a sputtering power of 100 to 500 W, and a pressure of argon gas of $1.0 \times 10^{-4}$ to $1.0 \times 10^{-2}$ Torr. The thin film can be formed in other ways such as vacuum evaporation or ion plating.

Figure 1:
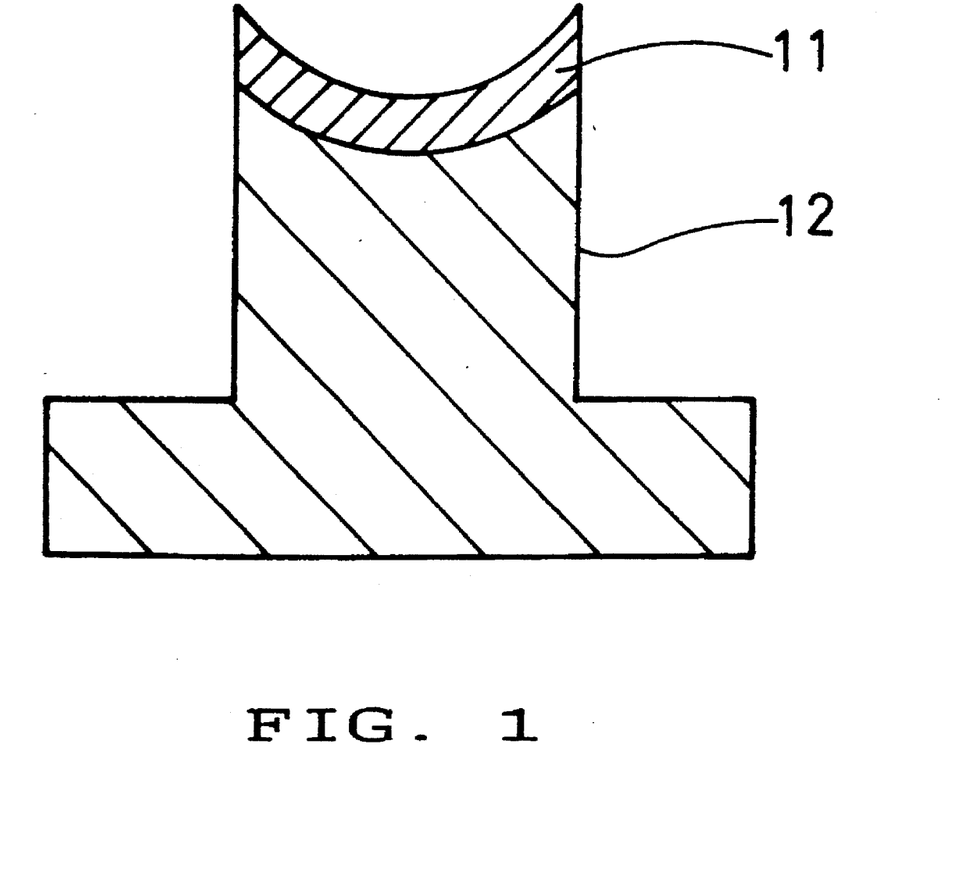
FIG. 1 is a sectional view of a press-molding die of a preferred embodiment of the invention.

FIG. 1 shows a die comprising WC cemented carbides base material 12 and Ta-Ir alloy thin film 11 having a thickness of 3 μ m.

Figure 2:
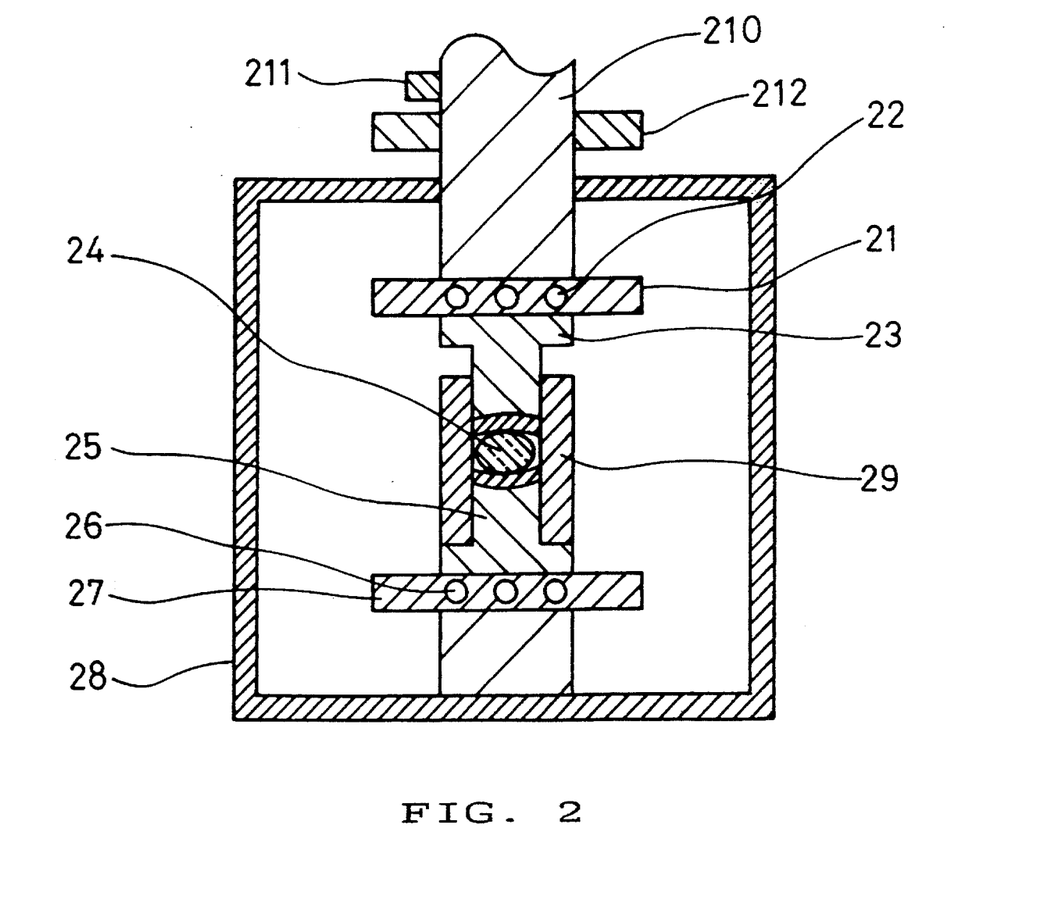
FIG. 2 is a sectional view of a press used in a preferred embodiment.

The dies were then placed in a press as shown in FIG. 2. The press was provided with upper heater block 21, upper heater 22, upper half die 23, sample glass 24, lower half die 25, lower heater 26, lower heater block 27, cover 28, side die 29, plunger 210, locating sensor 211, and stopper 212.

Schwer-Kronglass 24, which had been processed to a sphere with radius 5 mm, was placed on lower half die 25, on which upper half die 23 was then placed. They were heated up together to 700° C. A pressure of about 40 kg/cm² was applied to glass 24 through the upper and lower half dies 23 and 25 in a nitrogen atmosphere for 2 min. Afterwards, glass 24 was left to cool to 600° C., and finally taken out of the press.

After 10000 repetitions of the above pressing processes, the upper and lower half dies 23 and 25 were taken out of the press, and subjected to optical microscopic observation of their press-mold surfaces. At the same time, the roughness (RMS value, nm) of the surfaces was measured to judge the accuracy of each die. Tables 2-1, 2-2, 2-3 and 2-4 show the results of various Ta contents (wt %) of the Ta-Ir alloy thin film.

On the other hand, comparative embodiments were performed to judge the accuracy of conventional dies by repeating the above pressing 10000 times. The dies used were those of an SiC sintered body and those comprising cemented carbides base material and a Pt or Ir thin film thereon. Table 1 shows the results.

TABLE 1

| Sample No. | Die | Roughness of die surface before press-moldings (RMS value) | Condition and roughness of die surface after 10000 press-moldings | |
|---|---|---|---|---|
| | | | Roughness (RMS value) | Condition |
| 1 | SiC sintered body | 1.03 nm | Immeasurable | Glass attached |
| 2 | Pt sputtered film | 1.05 nm | 25.56 nm | White clouded |
| 3 | Ir sputtered film | 1.01 nm | 10.54 nm | White clouded |

Sample No. 1, made from an SiC sintered body alone, could not withstand more than 50 press-moldings, because the glass attached to both the upper and lower half dies. In other words, the die can not mass-produce glass optical elements.

Although sample Nos. 2 and 3, comprising a Pt or Ir sputtered film, were free from the glass after 10000 press-moldings, they exhibited rather high RMS values, such as 25.56 and 10.54 nm, proving their surfaces were very rough. They also became too cloudy for practical use. Observation of the die surface detected diffusion of Co, and grain growth of Pt or Ir due to heat.

Figure 3:
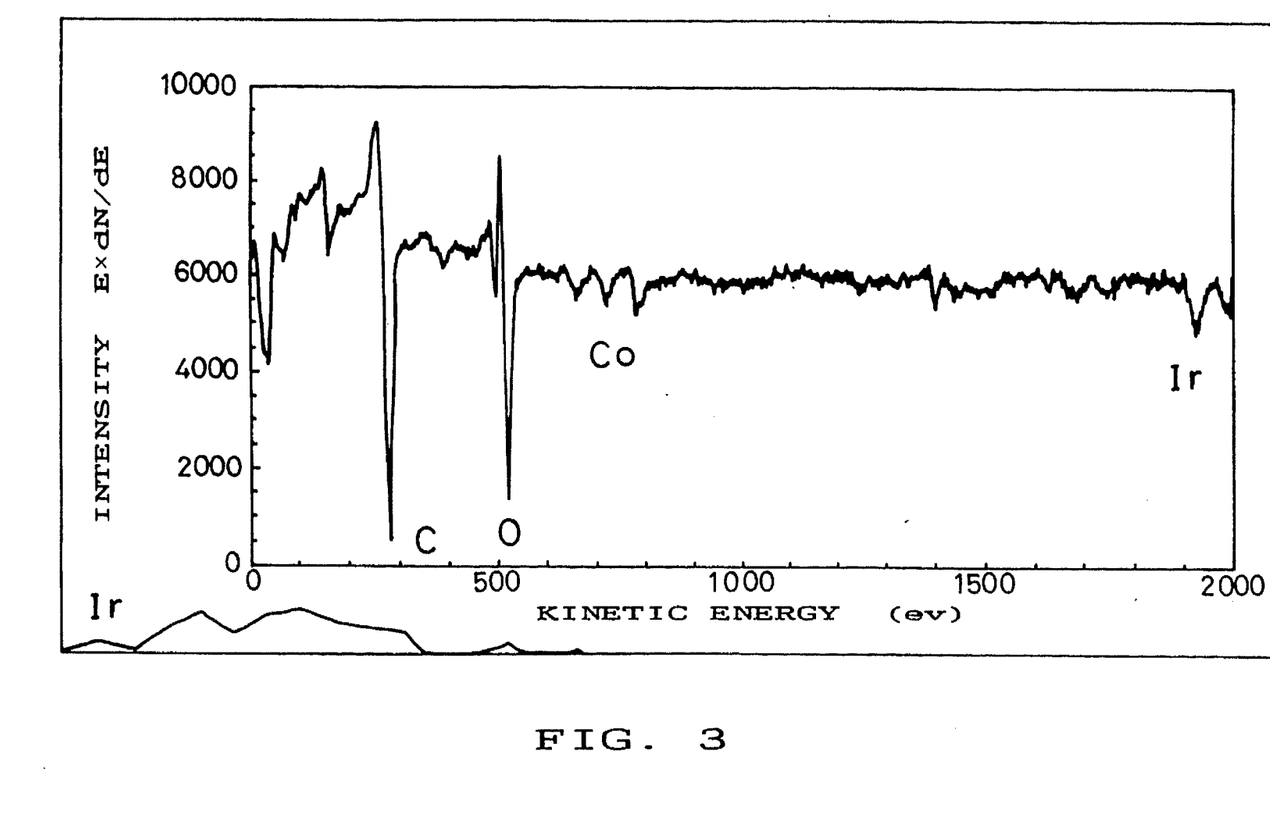
FIG. 3 is a chart of Auger electron spectroscopy (abbreviated as AES) analysis.

FIG. 3 shows the result of AES analysis revealing that Co was diffused in a die composed of cemented carbides and Ir film thereon after heat treatment at 870° C. in nitrogen gas for 1 hour.

TABLE 2-1

| Sample No. | Film composition (wt %) | | | Roughness of die surface before press-moldings (RMS value, nm) | Condition and roughness of die surface after 10000 press-moldings | |
|---|---|---|---|---|---|---|
| | Ta | Pt | Rh | | Roughness | Condition |
| 4 | 5 | 95 | 0 | 1.01 | 2.79 | Good |
| 5 | 30 | 70 | 0 | 0.98 | 0.99 | Good |
| 6 | 50 | 50 | 0 | 0.97 | 0.98 | Good |
| 7 | 70 | 30 | 0 | 0.99 | 1.00 | Good |
| 8 | 95 | 5 | 0 | 1.02 | 2.54 | Good |
| 9 | 5 | 0 | 95 | 1.04 | 3.07 | Good |
| 10 | 30 | 0 | 70 | 1.01 | 1.02 | Good |
| 11 | 50 | 0 | 50 | 1.02 | 1.03 | Good |
| 12 | 70 | 0 | 30 | 1.03 | 1.05 | Good |
| 13 | 95 | 0 | 5 | 1.02 | 2.96 | Good |

TABLE 2-2

| Sample No. | Film composition (wt %) | | | Roughness of die surface before press-moldings (RMS value, nm) | Condition and roughness of die surface after 10000 press-moldings | |
|---|---|---|---|---|---|---|
| | Ta | Ir | Ru | | Roughness | Condition |
| 14 | 5 | 95 | 0 | 0.99 | 2.89 | Good |
| 15 | 30 | 70 | 0 | 1.00 | 1.01 | Good |
| 16 | 50 | 50 | 0 | 0.98 | 1.00 | Good |
| 17 | 70 | 30 | 0 | 1.01 | 1.03 | Good |
| 18 | 95 | 5 | 0 | 0.99 | 2.95 | Good |
| 19 | 5 | 0 | 95 | 1.03 | 3.02 | Good |
| 20 | 30 | 0 | 70 | 1.00 | 1.02 | Good |
| 21 | 50 | 0 | 50 | 1.01 | 1.02 | Good |
| 22 | 70 | 0 | 30 | 1.01 | 1.02 | Good |
| 23 | 95 | 0 | 5 | 1.02 | 3.12 | Good |

TABLE 2-3

| Sample No. | Film composition (wt %) | | | Roughness of die surface before press-moldings (RMS value, nm) | Condition and roughness of die surface after 10000 press-moldings | |
|---|---|---|---|---|---|---|
| | Ta | Os | Re | | Roughness | Condition |
| 24 | 5 | 95 | 0 | 1.02 | 3.01 | Good |
| 25 | 30 | 70 | 0 | 1.02 | 1.04 | Good |
| 26 | 50 | 50 | 0 | 0.99 | 1.01 | Good |
| 27 | 70 | 30 | 0 | 1.00 | 1.02 | Good |
| 28 | 95 | 5 | 0 | 1.03 | 3.25 | Good |
| 29 | 5 | 0 | 95 | 1.00 | 3.31 | Good |
| 30 | 30 | 0 | 70 | 0.97 | 1.00 | Good |
| 31 | 50 | 0 | 50 | 0.99 | 1.00 | Good |
| 32 | 70 | 0 | 30 | 0.99 | 1.05 | Good |
| 33 | 95 | 0 | 5 | 1.01 | 3.78 | Good |

TABLE 2-4

| Sample No. | Film composition (wt %) | | | Roughness of die surface before press-moldings (RMS value, nm) | Condition and roughness of die surface after 10000 press-moldings | |
|---|---|---|---|---|---|---|
| | Ta | W | Pd | | Roughness | Condition |
| 34 | 5 | 95 | 0 | 1.03 | 2.99 | Good |
| 35 | 30 | 70 | 0 | 1.02 | 1.08 | Good |
| 36 | 50 | 50 | 0 | 1.04 | 1.08 | Good |
| 37 | 70 | 30 | 0 | 1.04 | 1.09 | Good |
| 38 | 95 | 5 | 0 | 1.03 | 2.76 | Good |
| 39 | 5 | 0 | 95 | 1.03 | 3.37 | Good |
| 40 | 30 | 0 | 70 | 1.05 | 1.06 | Good |
| 41 | 50 | 0 | 50 | 1.01 | 1.02 | Good |
| 42 | 70 | 0 | 30 | 1.03 | 1.05 | Good |
| 43 | 95 | 0 | 5 | 1.02 | 3.49 | Good |

Of sample Nos. 4 to 43, all dies having Ta alloy thin films with a Ta content of 30 to 70 wt % exhibited little change in their surfaces even after 10000 press-moldings, as well as the surface roughness. The remaining dies having Ta-Ir alloy thin films with a Ta content of 5 or 95 wt % exhibited a small change in surface roughness after 10000 press-moldings, compared to conventional dies.

The press-molding dies of this preferred embodiment comprising Ta-Ir alloy thin films with a Ta content of 30 to 70 wt % on the WC base material repeatedly press-mold higher-melting glass for a long time without deteriorating. It allows press-molding a large amount of fine higher-melting glass optical elements.

Similar results were achieved using dies comprising a base material formed of a TiN or TiC cermet as its principal component, and dies comprising a base material of a WC sintered body.

EXAMPLE 2

Two cermets comprising TiN as its principal component (20 mm diameter, 5 mm thick) were provided with concave press-mold surfaces whose curvature diameter were 46 mm and 200 mm, respectively, in the same manner as in Example 1. The concave press-mold surfaces were polished to a mirror surface using an abrasive grain of ultrafine diamonds. A 1 μm thick TaC film as a middle layer was formed on each of the mirrored press-mold surfaces by sputtering in the same manner as in Example 1. Further, a 3 μm thick Ta alloy thin film selected from a Ta-Pt, Ta-Rh, Ta-Ir, Ta-Ru, Ta-Os, Ta-Re, Ta-W, and Ta-Pd alloy thin films with a Ta content of 30 to 70 wt % was similarly formed on each of the TaC sputtered films to finish the dies.

Figure 4:
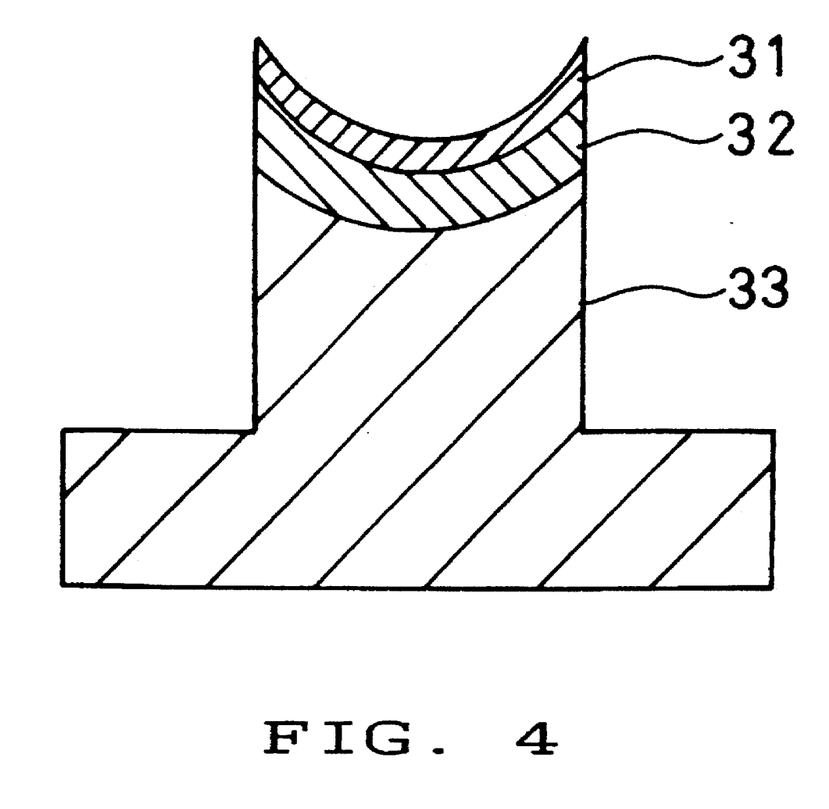
FIG. 4 is a sectional view of a press-molding die of another preferred embodiment.

FIG. 4 shows the die comprising TiC cermet base material 33, TaC thin film 32 and Ta-Ir alloy thin film 31 with the Ta content of 50 wt %.

The dies were then placed in the press shown in FIG. 2. Schwer-Kronglass 24, which had been processed to a sphere with radius 5 mm, was placed on lower half die 25, on which upper half die 23 was then placed. Press-moldings were conducted 100000 times in the same manner as in Example 1 to judge the life of each die. Tables 4-1, 4-2 and 4-3 show the results.

On the other hand, comparative embodiments were performed to judge the life of other dies after 80000 repetitions of the above-mentioned pressing. The dies used comprised a TiC cermet base material and a Ta-Ir alloy thin film with a Ta content of 30 to 70 wt %, and those comprising WC cemented carbides and a Ta-Ir alloy thin film with a Ta content of 30 to 70 wt % as used in Example 1. Table 3 shows the results.

TABLE 3

| Sample No. | Base material | Film composition | Adhesion of film to base material | | | |
|---|---|---|---|---|---|---|
| | | | After film-forming | After 10000 times | After 50000 times | After 80000 times |
| 44 | TiC | Ta(30)—Ir | ○* | ○ | ○ | Exfoliated |
| 45 | | Ta(50)—Ir | ○ | ○ | ○ | Exfoliated |
| 46 | | Ta(70)—Ir | ○ | ○ | ○ | Exfoliated |
| 47 | WC | Ta(30)—Ir | ○ | ○ | ○ | Exfoliated |
| 48 | | Ta(50)—Ir | ○ | ○ | ○ | Exfoliated |
| 49 | | Ta(70)—Ir | ○ | ○ | ○ | Exfoliated |

*The circle means that the film adhered to the base material well for practical use.

The dies of sample Nos. 44 to 49, having no middle layer between the base material and the Ta alloy thin film did not become rough and their thin films did not become exfoliated after 50000 press-moldings. After 80000 press-moldings, the film peeled off the base material. The dies could not withstand further use.

TABLE 4-1

| Sample No. | Film composition Middle layer: TaC | Adhesion of film to base material | | | |
|---|---|---|---|---|---|
| | | After film-forming | After 10000 times | After 50000 times | After 100000 times |
| 50 | Ta(30)—Pt | ○ | ○ | ○ | ○ |
| 51 | Ta(30)—Rh | ○ | ○ | ○ | ○ |
| 52 | Ta(30)—Ir | ○ | ○ | ○ | ○ |
| 53 | Ta(30)—Ru | ○ | ○ | ○ | ○ |
| 54 | Ta(30)—Os | ○ | ○ | ○ | ○ |
| 55 | Ta(30)—Re | ○ | ○ | ○ | ○ |
| 56 | Ta(30)—W | ○ | ○ | ○ | ○ |
| 57 | Ta(30)—Pd | ○ | ○ | ○ | ○ |

TABLE 4-2

| Sample No. | Film composition Middle layer: TaC | Adhesion of film to base material | | | |
|---|---|---|---|---|---|
| | | After film-forming | After 10000 times | After 50000 times | After 100000 times |
| 58 | Ta(50)—Pt | O | O | O | O |
| 59 | Ta(50)—Rh | O | O | O | O |
| 60 | Ta(50)—Ir | O | O | O | O |
| 61 | Ta(50)—Ru | O | O | O | O |
| 62 | Ta(50)—Os | O | O | O | O |
| 63 | Ta(50)—Re | O | O | O | O |
| 64 | Ta(50)—W | O | O | O | O |
| 65 | Ta(50)—Pd | O | O | O | O |

TABLE 4-3

| Sample No. | Film composition Middle layer: TaC | Adhesion of film to base material | | | |
|---|---|---|---|---|---|
| | | After film-forming | After 10000 times | After 50000 times | After 100000 times |
| 66 | Ta(70)—Pt | O | O | O | O |
| 67 | Ta(70)—Rh | O | O | O | O |
| 68 | Ta(70)—Ir | O | O | O | O |
| 69 | Ta(70)—Ru | O | O | O | O |
| 70 | Ta(70)—Os | O | O | O | O |
| 71 | Ta(70)—Re | O | O | O | O |
| 72 | Ta(70)—W | O | O | O | O |
| 73 | Ta(70)—Pd | O | O | O | O |

In contrast, the dies of sample Nos. 50 to 73, each comprising a TiC cermet base material, a TaC middle layer and a Ta alloy thin film thereon, were free from exfoliation of their alloy thin films even after 100000 press-moldings.

In other words, the TaC middle layer causes phase diffusion at the interfaces between the base material and the middle layer, and between the thin film and the middle layer, remarkably improving adhesion of the base material and the thin film. That extends the life of the dies without the thin film peeling off.

Though Example 2 used the TiC cermet base material, base materials of other carbides such as SiC, WC or TaC achieve similar results.

EXAMPLE 3

Two cermets comprising TiN as its principal component (20 mm diameter, 5 mm thick) were provided with concave press-mold surfaces those curvature diameters were 46 mm and 200 mm, respectively, in the same manner as in Example 1. The concave press-mold surfaces of the dies were polished to a mirror surface using an abrasive grain of ultrafine diamonds. A 1 μm thick TaN film as a middle layer was formed on each of the mirror surfaces by sputtering in the same manner as in Example 1. Further, on each of the TaN sputtered films, was formed a 3 μm thick Ta alloy thin film selected from a Ta-Pt, Ta-Rh, Ta-Ir, Ta-Ru, Ta-Os, Ta-Re, Ta-W, and Ta-Pd alloy thin films with a Ta content of 30 to 70 wt % to finish the dies.

Figure 5:
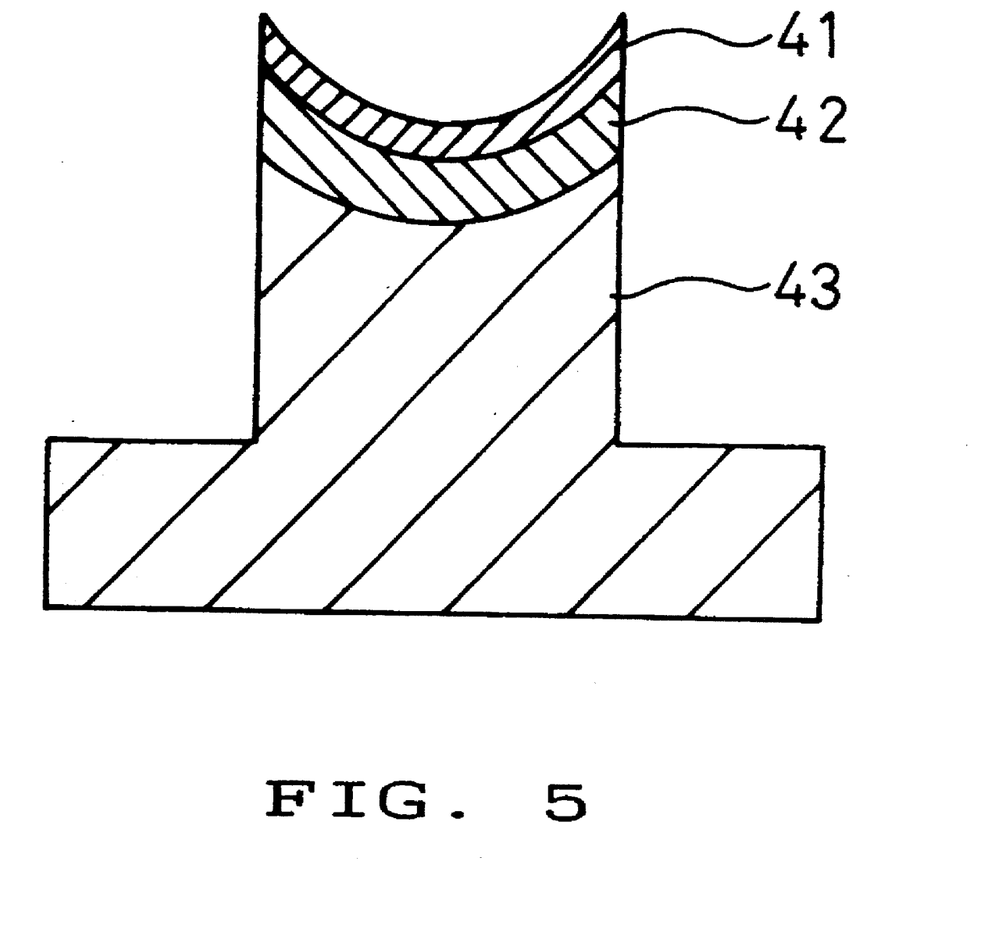
FIG. 5 is a sectional view of a press-molding die of still another preferred embodiment.

FIG. 5 shows the die comprising TiN cermet base material 43, TaN thin film 42, and Ta-Ir alloy thin film 41 with the Ta content of 50 wt %.

The dies were then placed in the press shown in FIG. 2. SK-14 glass 24 which had been processed to a sphere with radius 5 mm, was placed on lower half die 25, on which upper half die 23 was then placed. Press-moldings were conducted 100000 times in the same manner as in Example 1 to judge the life of each die. Tables 6-1, 6-2 and 6-3 show the results.

On the other hand, comparative embodiments were performed to similarly judge the life of other dies by repeating the above-mentioned press-molding processes 80000 times. The dies used were those comprising a TiN cermet base material and a Ta-Ir alloy thin film with a Ta content of 30 to 70 wt % and those comprising WC cemented carbides and a Ta-Ir alloy thin film with a Ta content of 30 to 70 wt % used in Example 1. Table 5 shows the results.

TABLE 5

| Sample No. | Base material | Film composition | Condition of die surface | | | |
|---|---|---|---|---|---|---|
| | | | After film-forming | After 10000 times | After 50000 times | After 80000 times |
| 74 | TiN | Ta(30)—Ir | O | O | O | Exfoliated |
| 75 | | Ta(50)—Ir | O | O | O | Exfoliated |
| 76 | | Ta(70)—Ir | O | O | O | Exfoliated |
| 77 | WC | Ta(30)—Ir | O | O | O | Exfoliated |
| 78 | | Ta(50)—Ir | O | O | O | Exfoliated |
| 79 | | Ta(70)—Ir | O | O | O | Exfoliated |

The dies of sample Nos. 74 to 79, having no middle layer between the base material and the alloy thin film did not become rough and the thin films were not exfoliated after 50000 press-moldings. After 80000 press-moldings, the films peeled off the base material. The dies could not withstand further use.

TABLE 6-1

| Sample No. | Film composition Middle layer: TaN | Adhesion of film to base material | | | |
|---|---|---|---|---|---|
| | | After film-forming | After 10000 times | After 50000 times | After 100000 times |
| 80 | Ta(30)—Pt | O | O | O | O |
| 81 | Ta(30)—Rh | O | O | O | O |
| 82 | Ta(30)—Ir | O | O | O | O |
| 83 | Ta(30)—Ru | O | O | O | O |
| 84 | Ta(30)—Os | O | O | O | O |
| 85 | Ta(30)—Re | O | O | O | O |
| 86 | Ta(30)—W | O | O | O | O |
| 87 | Ta(30)—Pd | O | O | O | O |

TABLE 6-2

| Sample No. | Film composition Middle layer: TaN | Adhesion of film to base material | | | |
|---|---|---|---|---|---|
| | | After film-forming | After 10000 times | After 50000 times | After 100000 times |
| 88 | Ta(50)—Pt | O | O | O | O |
| 89 | Ta(50)—Rh | O | O | O | O |
| 90 | Ta(50)—Ir | O | O | O | O |
| 91 | Ta(50)—Ru | O | O | O | O |
| 92 | Ta(50)—Os | O | O | O | O |
| 93 | Ta(50)—Re | O | O | O | O |
| 94 | Ta(50)—W | O | O | O | O |
| 95 | Ta(50)—Pd | O | O | O | O |

TABLE 6-3

| Sample No. | Film composition Middle layer: TaN | Adhesion of film to base material | | | |
|---|---|---|---|---|---|
| | | After film-forming | After 10000 times | After 50000 times | After 100000 times |
| 96 | Ta(70)—Pt | ○ | ○ | ○ | ○ |
| 97 | Ta(70)—Rh | ○ | ○ | ○ | ○ |
| 98 | Ta(70)—Ir | ○ | ○ | ○ | ○ |
| 99 | Ta(70)—Ru | ○ | ○ | ○ | ○ |
| 100 | Ta(70)—Os | ○ | ○ | ○ | ○ |
| 101 | Ta(70)—Re | ○ | ○ | ○ | ○ |
| 102 | Ta(70)—W | ○ | ○ | ○ | ○ |
| 103 | Ta(70)—Pd | ○ | ○ | ○ | ○ |

In contrast, the dies of sample Nos. 80 to 103, comprising a TiN cermet base material, a TaN middle layer and a Ta alloy thin film thereon, were free from exfoliation of their alloy thin films even after 100000 press-moldings.

In other words, the TaN middle layer causes phase diffusion at interfaces between the base material and the middle layer, and between the thin film and the middle layer, remarkably improving adhesion of the base material and the thin film. That extends the life of the dies without the thin film peeling off.

Though Example 3 used the TiN cermet base material, base materials formed of other nitrides achieve similar results.

EXAMPLE 4

Two $Al_2O_3$ materials (20 mm diameter, 5 mm thick) were provided with concave press-mold surfaces whose curvature diameters were 46 mm and 200 mm, respectively, in the same manner as in Example 1. The concave press-mold surfaces were polished to a mirror surface using an abrasive grain of ultrafine diamonds. A 1 μm thick $Ta_2O_5$ film as a middle layer was formed on each of the mirror surfaces by sputtering in the same manner as in Example 1. Further, on each $Ta_2O_5$ sputtered films, was formed a 3 μm thick Ta alloy thin film selected from a Ta-Pt, Ta-Rh, Ta-Ir, Ta-Ru, Ta-Os, Ta-Re, Ta-W, and Ta-Pd alloy thin films with a Ta content of 30 to 70 wt % to finish the dies.

Figure 6:
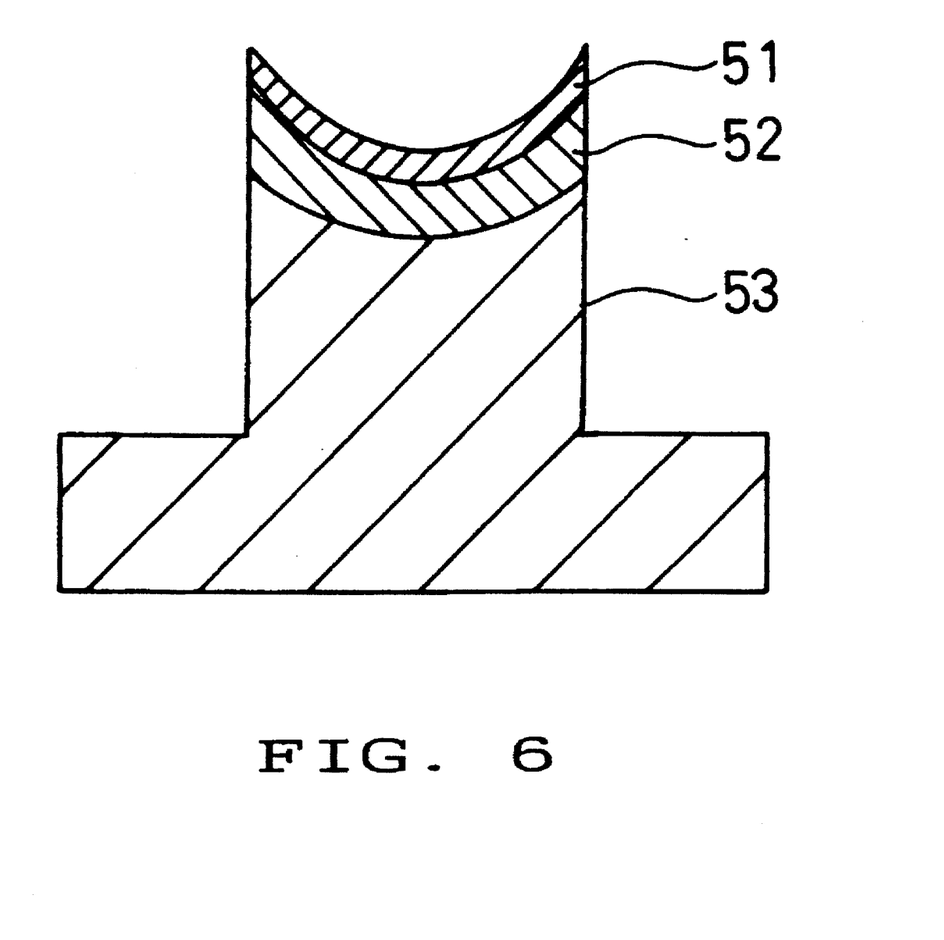
FIG. 6 is a sectional view of a press-molding die of a further preferred embodiment.

FIG. 6 shows the die comprising $Al_2O_3$ cermet base material 53, $Ta_2O_5$ thin film 52 and Ta-Ir alloy thin film 51 with the Ta content of 50 wt %.

The dies were then placed in the press shown in FIG. 2. SK-14 glass 24 which had been processed to a sphere with radius 5 mm, was placed on lower half die 25, on which upper half die 23 was then placed. Press-moldings were conducted 100000 times in the same manner as in Example 1 to judge the life of each die. Tables 8-1, 8-2 and 8-3 show the results.

On the other hand, comparative embodiments were performed similarly judge the life of other dies by repeating the above-mentioned pressing 70000 times. The dies used were those comprising an $Al_2O_3$ base material and a Ta-Ir alloy thin film with a Ta content of 30 to 70 wt % and those comprising WC cemented carbides base material and a Ta-Ir alloy thin film with a Ta content of 30 to 70 wt % used in Example 1. Table 7 shows the results.

TABLE 7

| Sample No. | Base material | Film composition | Adhesion of film to base material | | | |
|---|---|---|---|---|---|---|
| | | | After film-forming | After 10000 times | After 50000 times | After 70000 times |
| 104 | $Al_2O_3$ | Ta(30)—Ir | ○ | ○ | ○ | Exfoliated |
| 105 | | Ta(50)—Ir | ○ | ○ | ○ | Exfoliated |
| 106 | | Ta(70)—Ir | ○ | ○ | ○ | Exfoliated |
| 107 | WC | Ta(30)—Ir | ○ | ○ | ○ | Exfoliated |
| 108 | | Ta(50)—Ir | ○ | ○ | ○ | Exfoliated |
| 109 | | Ta(70)—Ir | ○ | ○ | ○ | Exfoliated |

The dies of sample Nos. 104 to 109, having no middle layer between the base material and the alloy thin film did not become rough and the thin films were not exfoliated after 50000 press-moldings. After 70000 press-moldings, the films peeled off the base material. The dies could not withstand further use.

TABLE 8-1

| Sample No. | Film composition Middle layer: $Ta_2O_5$ | Adhesion of film to base material | | | |
|---|---|---|---|---|---|
| | | After film-forming | After 10000 times | After 50000 times | After 100000 times |
| 110 | Ta(30)—Pt | ○ | ○ | ○ | ○ |
| 111 | Ta(30)—Rh | ○ | ○ | ○ | ○ |
| 112 | Ta(30)—Ir | ○ | ○ | ○ | ○ |
| 113 | Ta(30)—Ru | ○ | ○ | ○ | ○ |
| 114 | Ta(30)—Os | ○ | ○ | ○ | ○ |
| 115 | Ta(30)—Re | ○ | ○ | ○ | ○ |
| 116 | Ta(30)—W | ○ | ○ | ○ | ○ |
| 117 | Ta(30)—Pd | ○ | ○ | ○ | ○ |

TABLE 8-2

| Sample No. | Film composition Middle layer: $Ta_2O_5$ | Adhesion of film to base material | | | |
|---|---|---|---|---|---|
| | | After film-forming | After 10000 times | After 50000 times | After 100000 times |
| 118 | Ta(50)—Pt | ○ | ○ | ○ | ○ |
| 119 | Ta(50)—Rh | ○ | ○ | ○ | ○ |
| 120 | Ta(50)—Ir | ○ | ○ | ○ | ○ |
| 121 | Ta(50)—Ru | ○ | ○ | ○ | ○ |
| 122 | Ta(50)—Os | ○ | ○ | ○ | ○ |
| 123 | Ta(50)—Re | ○ | ○ | ○ | ○ |
| 124 | Ta(50)—W | ○ | ○ | ○ | ○ |
| 125 | Ta(50)—Pd | ○ | ○ | ○ | ○ |

TABLE 8-3

| Sample No. | Film composition Middle layer: $Ta_2O_5$ | Adhesion of film to base material | | | |
|---|---|---|---|---|---|
| | | After film-forming | After 10000 times | After 50000 times | After 100000 times |
| 126 | Ta(70)—Pt | ○ | ○ | ○ | ○ |
| 127 | Ta(70)—Rh | ○ | ○ | ○ | ○ |
| 128 | Ta(70)—Ir | ○ | ○ | ○ | ○ |
| 129 | Ta(70)—Ru | ○ | ○ | ○ | ○ |
| 130 | Ta(70)—Os | ○ | ○ | ○ | ○ |

TABLE 8-3-continued

| Sample No. | Film composition Middle layer: Ta₂O₅ | Adhesion of film to base material | | | |
|---|---|---|---|---|---|
| | | After film-forming | After 10000 times | After 50000 times | After 100000 times |
| 131 | Ta(70)—Re | O | O | O | O |
| 132 | Ta(70)—W | O | O | O | O |
| 133 | Ta(70)—Pd | O | O | O | O |

In contrast, the dies of sample Nos. 110 to 133, comprising the Al₂O₃ base material, a TaN middle layer and a Ta alloy thin film thereon, were free from exfoliation of the alloy thin films after 100000 press-moldings.

In other words, the TaN middle layer causes phase diffusion at the interfaces between the base material and the middle layer, and between the thin film and the middle layer, remarkably improving adhesion of the base material and the thin film. That extends the life of the dies without the thin film peeling off.

Though Example 4 used the TiN cermet base material, base materials formed of other nitrides achieve similar results.

EXAMPLE 5

Two WC cemented carbides (20 mm diameter, 5 mm thick) were provided with concave press-mold surfaces whose curvature diameters were 46 mm and 200 mm, respectively, in the same manner as in Example 1. The concave press-mold surfaces were polished to a mirror surface using an abrasive grain of ultrafine diamonds. A 1 μm thick Ta₂O₅ film as a middle layer was formed on each mirror surface by sputtering in the same manner as in Example 1. Further, on each of the Ta₂O₅ sputtered films, was formed a 3 μm thick Ta alloy thin film selected from a Ta-Pt, Ta-Rh, Ta-Ir, Ta-Ru, Ta-Os, Ta-Re, Ta-W, and Ta-Pd alloy thin films with a Ta content of 30 to 70 wt % to finish the dies. Also, dies comprising a tungsten (W) middle layer were similarly formed.

Figure 7:
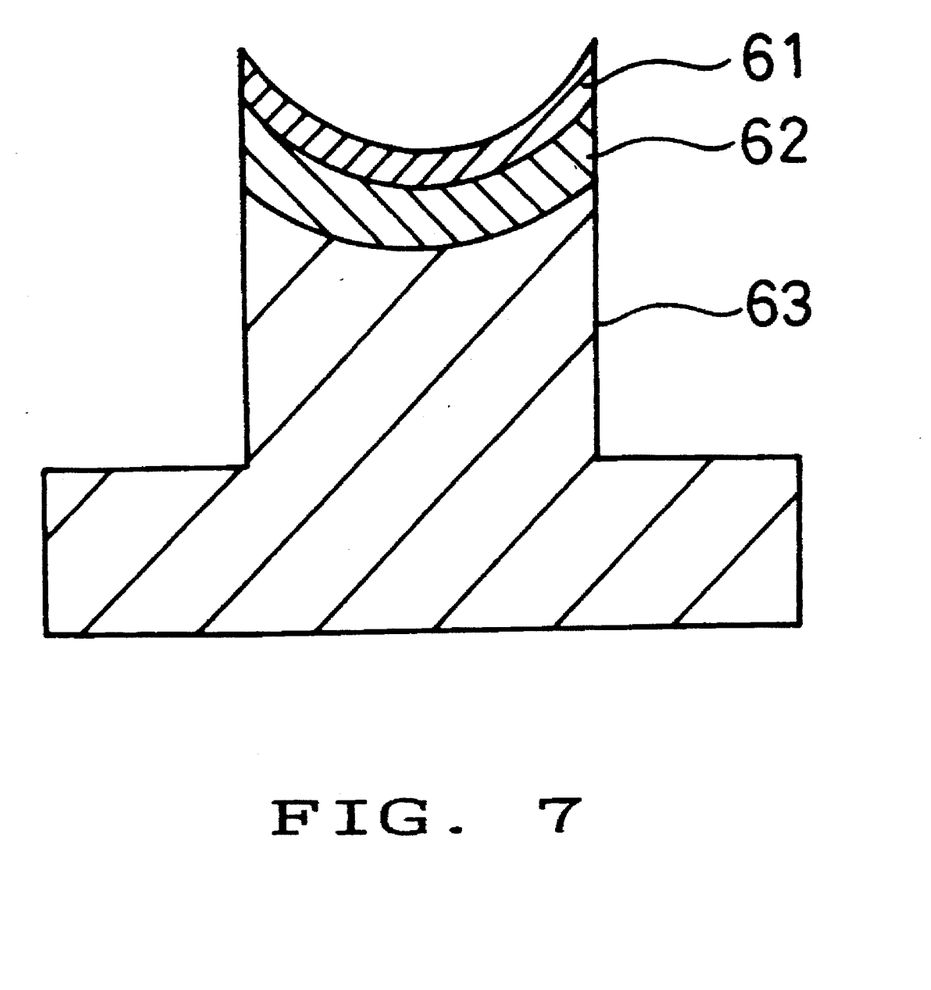
FIG. 7 is a sectional view of a press-molding die of a still further preferred embodiment.

FIG. 7 shows the die comprising WC cemented carbides base material 63, Re middle layer 62 and Ta-Ir alloy thin film 61 with the Ta content of 50 wt %.

The dies were then placed in the press shown in FIG. 2. Glass 24 selected from Schwer-Flint glass, SK-14 glass, aluminum zinc silicate glass and borosilicate glass, which had been processed to a sphere with radius 5 mm, was placed on lower half die 25, on which upper half die 23 was then placed. Glass 24 was press-molded at a suitable temperature, such as 600° C. for Schwer-Flint glass, 700° C. for SK-14 glass, 800° C. for aluminum zinc silicate glass and 900° C. for borosilicate glass.

Press-moldings were conducted 1000 times in the same manner as in Example 1 using each glass. Afterward, the dies were observed by AES analysis to examine diffusion of Co on their surfaces. At the same time, the roughness of the die surface (RMS value, nm) was measured to judge the accuracy of the dies. Tables 10-1 through 10-6 show the results.

On the other hand, comparative embodiments were performed to similarly judge the accuracy of the dies comprising WC cemented carbides and a Ta-Ir alloy thin film with a Ta content of 30 to 70 wt % used in Example 1. Table 9 shows the results.

TABLE 9

| Sample No. | Film composition | Condition of die surface after 1000 press-moldings (RMS value, nm) | | | |
|---|---|---|---|---|---|
| | | 600° C. | 700° C. | 800° C. | 900° C. |
| 134 | Ta(30)—Ir | 1.43 | 2.04 | 7.14 | 20.17 |
| 135 | Ta(50)—Ir | 1.63 | 2.36 | 9.11 | 22.93 |
| 136 | Ta(70)—Ir | 1.61 | 2.29 | 8.53 | 21.64 |

TABLE 10-1

| Sample No. | Film composition Middle layer: Re | Condition of die surface after 1000 press-moldings (RMS value, nm) | | | |
|---|---|---|---|---|---|
| | | 600° C. | 700° C. | 800° C. | 900° C. |
| 137 | Ta(30)—Pt | 1.04 | 1.08 | 1.14 | 1.18 |
| 138 | Ta(30)—Rh | 1.03 | 1.06 | 1.08 | 1.18 |
| 139 | Ta(30)—Ir | 1.07 | 1.09 | 1.16 | 1.20 |
| 140 | Ta(30)—Ru | 1.05 | 1.08 | 1.16 | 1.24 |
| 141 | Ta(30)—Os | 1.03 | 1.08 | 1.14 | 1.26 |
| 142 | Ta(30)—Re | 1.05 | 1.09 | 1.18 | 1.25 |
| 143 | Ta(30)—W | 1.06 | 1.09 | 1.13 | 1.22 |
| 144 | Ta(30)—Pd | 1.05 | 1.08 | 1.17 | 1.28 |

TABLE 10-2

| Sample No. | Film composition Middle layer: Re | Condition of die surface after 1000 press-moldings (RMS value, nm) | | | |
|---|---|---|---|---|---|
| | | 600° C. | 700° C. | 800° C. | 900° C. |
| 145 | Ta(50)—Pt | 1.04 | 1.09 | 1.17 | 1.20 |
| 146 | Ta(50)—Rh | 1.06 | 1.08 | 1.17 | 1.28 |
| 147 | Ta(50)—Ir | 1.05 | 1.08 | 1.13 | 1.21 |
| 148 | Ta(50)—Ru | 1.07 | 1.12 | 1.15 | 1.20 |
| 149 | Ta(50)—Os | 1.04 | 1.09 | 1.15 | 1.18 |
| 150 | Ta(50)—Re | 1.06 | 1.12 | 1.16 | 1.22 |
| 151 | Ta(50)—W | 1.06 | 1.09 | 1.14 | 1.26 |
| 152 | Ta(50)—Pd | 1.08 | 1.14 | 1.19 | 1.26 |

TABLE 10-3

| Sample No. | Film composition Middle layer: Re | Condition of die surface after 1000 press-moldings (RMS value, nm) | | | |
|---|---|---|---|---|---|
| | | 600° C. | 700° C. | 800° C. | 900° C. |
| 153 | Ta(70)—Pt | 1.06 | 1.09 | 1.15 | 1.27 |
| 154 | Ta(70)—Rh | 1.04 | 1.08 | 1.11 | 1.23 |
| 155 | Ta(70)—Ir | 1.07 | 1.16 | 1.19 | 1.26 |
| 156 | Ta(70)—Ru | 1.03 | 1.07 | 1.13 | 1.21 |
| 157 | Ta(70)—Os | 1.08 | 1.12 | 1.16 | 1.24 |
| 158 | Ta(70)—Re | 1.06 | 1.09 | 1.17 | 1.29 |
| 159 | Ta(70)—W | 1.09 | 1.13 | 1.18 | 1.27 |
| 160 | Ta(70)—Pd | 1.07 | 1.13 | 1.16 | 1.25 |

TABLE 10-4

| Sample No. | Film composition Middle layer: W | Condition of die surface after 1000 press-moldings (RMS value, nm) | | | |
|---|---|---|---|---|---|
| | | 600° C. | 700° C. | 800° C. | 900° C. |
| 161 | Ta(30)—Pt | 1.05 | 1.07 | 1.10 | 1.19 |
| 162 | Ta(30)—Rh | 1.03 | 1.09 | 1.18 | 1.21 |
| 163 | Ta(30)—Ir | 1.05 | 1.08 | 1.11 | 1.25 |
| 164 | Ta(30)—Ru | 1.04 | 1.09 | 1.20 | 1.28 |

TABLE 10-4-continued

| Sample No. | Film composition Middle layer: W | Condition of die surface after 1000 press-moldings (RMS value, nm) | | | |
|---|---|---|---|---|---|
| | | 600° C. | 700° C. | 800° C. | 900° C. |
| 165 | Ta(30)—Os | 1.06 | 1.13 | 1.20 | 1.28 |
| 166 | Ta(30)—Re | 1.02 | 1.04 | 1.13 | 1.25 |
| 167 | Ta(30)—W | 1.04 | 1.07 | 1.13 | 1.24 |
| 168 | Ta(30)—Pd | 1.06 | 1.11 | 1.19 | 1.27 |

TABLE 10-5

| Sample No. | Film composition Middle layer: W | Condition of die surface after 1000 press-moldings (RMS value, nm) | | | |
|---|---|---|---|---|---|
| | | 600° C. | 700° C. | 800° C. | 900° C. |
| 169 | Ta(50)—Pt | 1.03 | 1.08 | 1.17 | 1.26 |
| 170 | Ta(50)—Rh | 1.05 | 1.09 | 1.18 | 1.27 |
| 171 | Ta(50)—Ir | 1.01 | 1.07 | 1.14 | 1.23 |
| 172 | Ta(50)—Ru | 1.03 | 1.08 | 1.16 | 1.27 |
| 173 | Ta(50)—Os | 1.05 | 1.09 | 1.12 | 1.22 |
| 174 | Ta(50)—Re | 1.03 | 1.08 | 1.13 | 1.23 |
| 175 | Ta(50)—W | 1.07 | 1.10 | 1.15 | 1.24 |
| 176 | Ta(50)—Pd | 1.05 | 1.08 | 1.13 | 1.20 |

TABLE 10-6

| Sample No. | Film composition Middle layer: W | Condition of die surface after 1000 press-moldings (RMS value, nm) | | | |
|---|---|---|---|---|---|
| | | 600° C. | 700° C. | 800° C. | 900° C. |
| 177 | Ta(70)—Pt | 1.04 | 1.09 | 1.13 | 1.21 |
| 178 | Ta(70)—Rh | 1.03 | 1.09 | 1.18 | 1.25 |
| 179 | Ta(70)—Ir | 1.06 | 1.12 | 1.21 | 1.30 |
| 180 | Ta(70)—Ru | 1.04 | 1.08 | 1.13 | 1.22 |
| 181 | Ta(70)—Os | 1.02 | 1.06 | 1.14 | 1.20 |
| 182 | Ta(70)—Re | 1.05 | 1.09 | 1.17 | 1.25 |
| 183 | Ta(70)—W | 1.03 | 1.08 | 1.16 | 1.24 |
| 184 | Ta(70)—Pd | 1.07 | 1.09 | 1.13 | 1.21 |

Diffusion of Co on the surfaces of the dies was also examined by AES analysis. After 1000 press-moldings at 800° C., Co was detected on the dies of sample Nos. 134 to 136, which had no middle layer between the base material and the Ta alloy thin film, the surfaces of the dies became rough. After 1000 press-moldings at 900° C., more Co was detected, and the die surfaces got very rough.

In contrast, the dies of sample Nos. 137 to 184, which had the Re or W middle layer between the base material and the Ta alloy thin film, were free from Co diffusion even after 1000 press-moldings at 900° C., and they kept almost the same surface as that just after sputtering.

In other words, the Re or W middle layer prevents a binder metal in the base material, such as Co, from diffusing into the surfaces due to heat. Therefore, the press-molding die can mass-produce very fine higher-melting glass optical elements without deteriorating.

Though Example 5 used the WC cemented carbides base material, other base materials formed of a cermet comprising TiN or TiC achieve similar results.

The invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A die for press-molding a glass optical element comprising:

a base material having a surface to press-mold glass; and a tantalum(Ta)-containing alloy thin layer on said surface, said base material having heat-resistance and strength enough to withstand press-molding, wherein said tantalum(Ta)-containing alloy consists of tantalum and one element selected from the group consisting of platinum, rhodium, iridium, ruthenium, osmium, rhenium, tungsten and palladium.

2. The die for press-molding a glass optical element according to claim 1, wherein the Ta content of said Ta-containing alloy thin layer is 5 to 95 wt %.

3. The die for press-molding a glass optical element according to claim 1, wherein said Ta-containing alloy thin layer has a thickness of 1 to 5 μm.

4. The die for press-molding a glass optical element according to claim 1, wherein said base material comprises at least one material selected from the group consisting of cemented carbides comprising tungsten carbide (WC) as its principal component, a cermet comprising titanium carbide (TIC) as its principal component, a cermet comprising titanium nitride (TIN) as its principal component and a tungsten carbide (WC) sintered body.

5. The die for press-molding a glass optical element according to claim 4, further comprising a middle layer between said base material and said Ta-containing alloy thin layer for strengthening adhesion of said base material to said Ta-containing alloy thin layer, wherein said middle layer comprises at least one material selected from the group consisting of tantalum carbide (TaC), tantalum nitride (TaN) and tantalum oxide ($Ta_2O_5$).

6. The die for press-molding a glass optical element according to claim 5, wherein adhesion of said base material to said middle layer and adhesion of said middle layer to said Ta-containing alloy thin layer are each stronger than adhesion of said base material to said Ta-containing alloy thin layer.

7. The die for press-molding a glass optical element according to claim 5 or 6, wherein said base material is a cemented carbide comprising WC as its principal component, a cermet comprising TiC as its principal component, or a WC sintered body and said middle layer comprises tantalum carbide (TaC).

8. The die for press-molding a glass optical element according to claim 5 or 6, wherein said base material is a cermet comprising TiN as its principal component and said middle layer comprises tantalum carbide (TaC).

9. The die for press-molding a glass optical element according to claim 5 or 6 wherein said base material is an oxide and said middle layer comprises tantalum oxide ($Ta_2O_5$).

10. The die for press-molding a glass optical element according to claim 1, wherein said base material comprises a tungsten carbide sintered body, and wherein a middle layer is formed between said base material and said Ta-containing alloy thin layer, and said middle layer is a heat-diffusion preventive layer to prevent a metal in said base material from diffusing into said Ta-containing alloy thin layer due to heat.

11. The die for press-molding a glass optical element according to claim 10, wherein said heat-diffusion preventive layer comprises at least one material selected from the group consisting of rhenium and tungsten.

12. The die for press-molding a glass optical element according to claim 5 or 10, wherein said middle layer has a thickness of 1 to 3 µm.

* * * * *